Nov. 26, 1963 G. T. BARRETT ETAL 3,112,470

NOISE CANCELLATION FOR MAGNETIC MEMORY DEVICES

Filed Nov. 10, 1958

2 Sheets-Sheet 1

INVENTORS.
GEORGE T. BARRETT
and ALBERT H. ASHLEY
BY F. L. Sullivan
ATTORNEY.

INVENTORS.
GEORGE T. BARRETT
and ALBERT H. ASHLEY.
BY F. Q. Sullivan
ATTORNEY.

3,112,470

NOISE CANCELLATION FOR MAGNETIC MEMORY DEVICES

George T. Barrett, Woburn, and Albert H. Ashley, Bedford, Mass., assignors, by mesne assignments, to Sylvania Electric Products Inc., Wilmington, Del., a corporation of Delaware Filed Nov. 10, 1958, Ser. No. 772,825
3 Claims. (Cl. 340—174)

This invention is concerned with electronic data processing systems, and particularly with means for improving the reliability of the signal output from magnetic memory devices used in such systems.

These devices find wide application in electronic data processing memory systems where they store electromagnetic indication of the information being processed. A typical example is magnetic core memories wherein individual ferrite cores each store a bit of binary information, representing a "one" or a "zero," by the condition of their respective states of remanent magnetic flux.

The cores used in such memories are characterized by a square hysteresis loop. This gives them a bistable quality manifested by their state of flux being disturbed, but not changed in direction when they are subjected to current impulses of the proper polarity but less than the necessary critical value to accomplish flux reversal. Once, however, the critical value of reversing current is applied, a complete switching of the polarity of their state of flux occurs. Copending U.S. patent application Serial No. 679,967, filed August 23, 1957, now U.S. Patent No. 3,058,096, describes how such cores may be organized into a complete memory system and how such a system may be operated.

Briefly, magnetic cores are caused to assume a condition of flux corresponding to the storage of a binary one by subjecting them to what is termed a full write current pulse. This pulse is provided by the coincidence of separate half write pulses conducted through different conductors linking the core. Each of these conductors also links other cores in the memory system but, since each conducts only a half write pulse, they disturb but do not switch these other cores from their previous flux condition where they represent a binary zero in the program of information under process.

Read-out of the information stored is accomplished by subjecting the core concerned to a current pulse of sufficient amplitude, and proper polarity, to reverse the flux condition of a core storing a "one." This reversal induces a desired voltage signal in an output winding linking the core. There should be no signal output if the core had been in the "zero" state at the time the read pulse was applied. Inconveniently, however, these cores deliver a signal output responsive to flux disturbances as well as to complete reversals; and, if this noise signal is strong enough it becomes impossible to distinguish a noisy "zero" from a true "one."

The nature and amplitude of noise disturbances depends upon the geometry and physical properties of the cores and also their electrical history. One of the principal difficulties is the effect of half write pulses on a core which is supposed to represent a "zero." Another, is the sudden current rise of the read pulse. The amplitude of this latter noise is directly proportional to the relationship of the change in current to the time in which this change is accomplished. Hence, this latter disturbance is referred to as "*di/dt* noise."

Jan A. Rajchman in an article entitled "Ferrite Apertured Plate for Random Access Memory" in the March 1957 Proceedings of the IRE refers to two methods for canceling out such noises in memory systems. One of these methods is to neutralize the noise signal with a fixed voltage derived from an auxiliary memory core at the instant of read out. This technique is subject, however, to the inadequacy of having only a fixed voltage available to compensate for a variable disturbance.

The second method is to provide two cores for every bit capacity of the memory system. These cores are located in back-to-back memory planes having their output windings connected in series opposition. The signals stored in one plane represent "ones" and those stored in the other plane represent "zeros." It is intended that the noises accumulated along the two sense windings should cancel each other. Thus, the polarity of the net signal should indicate from which plane it is derived and, consequently, whether it represents a "one" or a "zero." This technique is similar to the conventional selective wiring of the sense output winding of a memory plane so that half of its cores are linked in a forward and half in a reevrse direction for noise canceling purposes in a manner described in the above-referenced patent application. Its effectiveness, however, is dependent upon non-selected cores on each winding experiencing the same electrical history.

Accordingly, a principal objective of the present invention is to provide an improved technique for canceling the undesired disturbance and noise effects in magnetic memory systems. Another objective is to provide a magnetic memory output technique which will be less sensitive to signal-to-noise ratio than those hitherto available.

These and related objectives are accomplished in one embodiment of the invention by a magnetic core memory system which features a single noise cancellation core common to each group of cores simultaneously selected for read-out purposes, for example, those corresponding to the digits of each separate data processing word. This noise canceling core is subjected to the same full read pulse as its associated information cores and also a half write pulse for every memory cycle. Hence, it is driven to a "write disturbed zero" condition, which produces an approximately maximum noise signal, before every read-out.

The group of each digit-representing core within each word group is connected to a separate differential amplifier which has a second input, the signal from the noise canceling core of that particular group. Consequently, the effects of the "*di/dt* noise" of the reading pulse and "half write disturbed zeros" cancel each other and the amplifier provides an output only in response to a stored "one" signal. Thus, each core selected for read-out and an associated noise canceling core are both subjected to the same electrical history, except for the additional half write pulse which accomplishes flux reversal to store a "one." The noise signals cancel each other in the differential amplifier; and, at its output, there is a signal if a "one" was stored in the selected core and no signal if the core was in "zero" condition at the moment of read-out.

Other features, modifications, and embodiments of the invention will be apparent from the following description and reference to the accompanying drawings, wherein.

Figure 1:
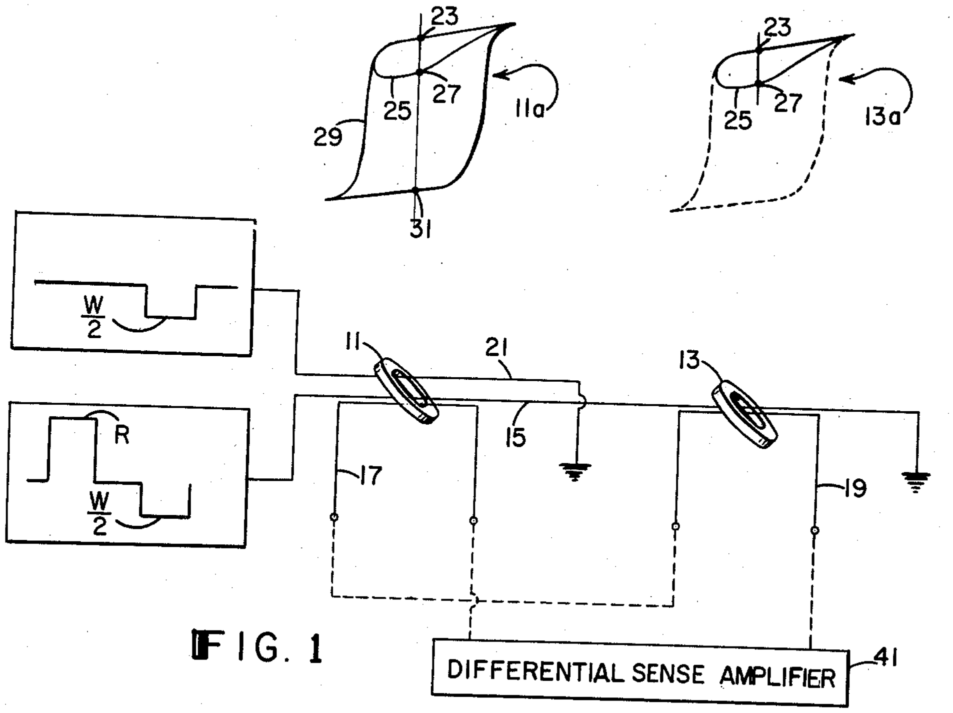
FIG. 1 is a diagrammatic representation of an information storing and a noise canceling core with their respective input and output signal windings, input pulses, and hysteresis curves.
Figure 2:
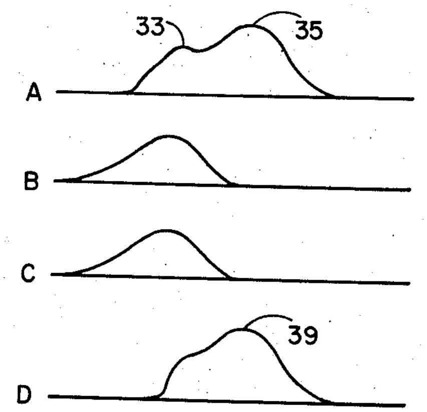
FIG. 2A is a diagrammatic representation of a "one" signal output from the information core of FIG. 1.
FIG. 2B represents the "zero" signal output from the same core.
FIG. 2C represents the signal output from the noise canceling core of FIG. 1.
Figure 3:
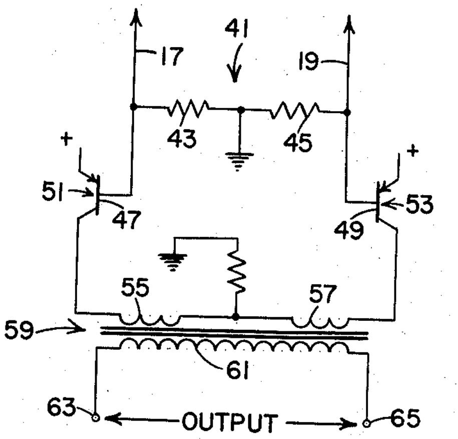
Figure 4:
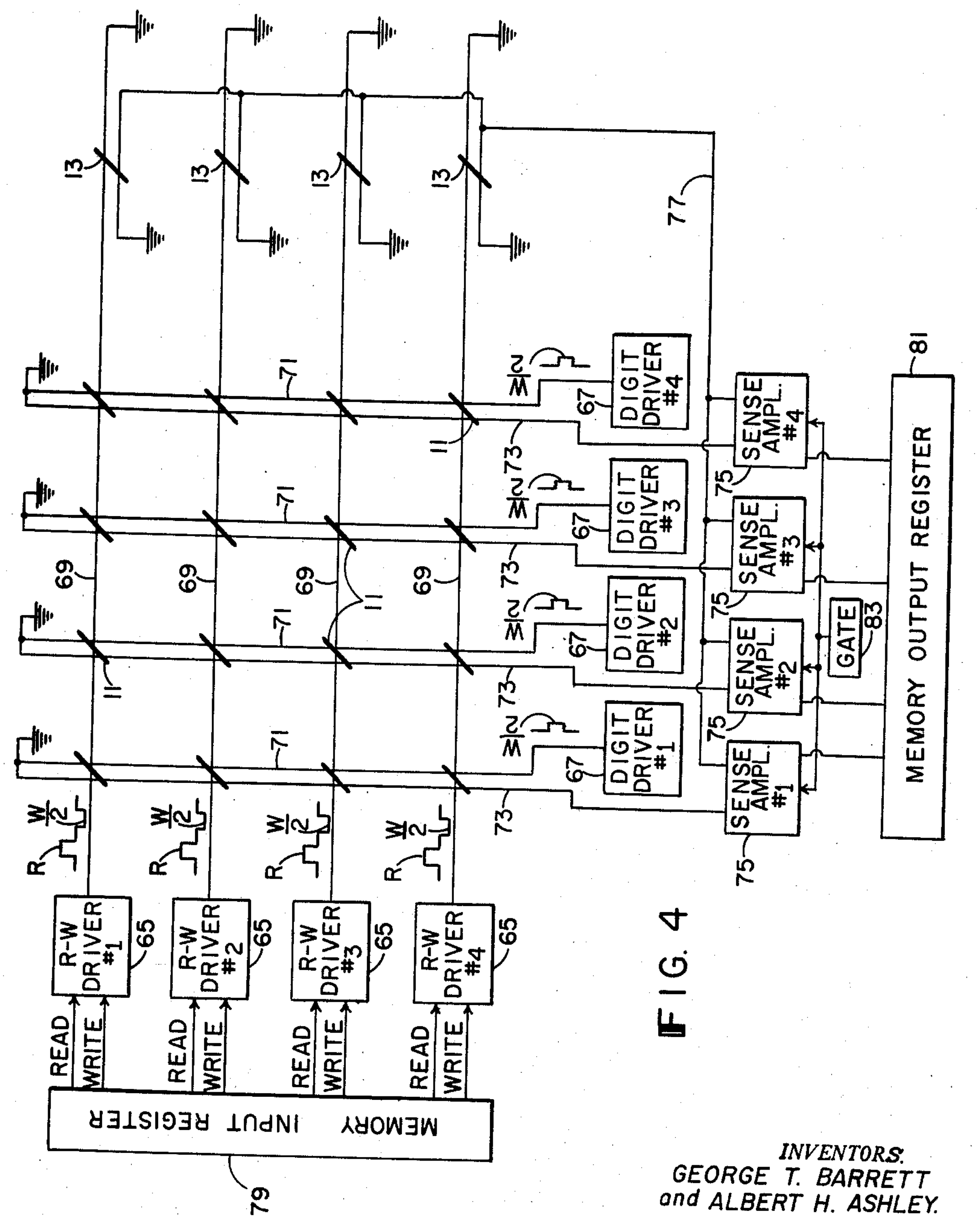

FIG. 2D similarly represents the output signal from the differential sense amplifier of FIG. 1;

FIG. 3 is a schematic diagram of a differential sense amplifier for the system of FIG. 1; and, FIG. 4 is a diagrammatic representation of a memory system embodying the invention.

The diagram of FIG. 1 shows an information core 11 and a noise canceling core 13 each linked by a common driving conductor 15. Each core has a separate output or sense winding, 17 and 19, respectively; and, the information core 11 has an additional driving or input conductor 21.

The common drive conductor 15 has as its input a full read pulse R and a half write pulse $W/2$ following each other in a repetitive cycle. The input to the conductor 21, which links the information core 11 only, is a half write pulse $W/2$ which coincides in time with the half write pulse applied to conductor 15. Thus, each of the cores 11 and 13 experiences a constant cycle of half write pulse followed by a full read pulse; and, in addition, core 11 has its normal half write pulse increased to a full write whenever a half write pulse is applied to its second input conductor 21.

The effect of these various current pulses on the state of remanent magnetic flux in the two cores is shown diagrammatically in the hysteresis curves 11*a* and 13*a* respectively. A full read pulse drives each of the cores to the point 23 at the top of their respective hysteresis plots; a half write followed by a full read drives them in their minor loops 25, through points 27; and, the full drive current resulting in core 11 from the coincidence of half write pulses on both conductors 21 and 15 drives this core in its major, and substantially square, loop 29 through point 31.

The output voltage signals derived from the sense windings 17 of information core 11 in response to a stored "one" is represented diagrammatically in FIG. 2A. The noise portion due to various disturbances is shown at 33, and the "one" signal due to flux reversal, at 35. FIG. 2B shows the signal output of the same core when it had been in "zero" condition at the moment of read-out. As explained above with reference to the hysteresis plots 11*a* and 13*a* in FIG. 1, this particular signal is due principally to the $di/dt$ of the read pulse and the half write disturbance of a core in "zero" condition. FIG. 2C demonstrates an identical noise signal output from the canceling core 13. This occurs because this core experiences the same pulse sequence, from the same source, as the "zero" core.

The basic problem of distinguishing a noisy "zero" from a "one" signal is a primary concern of the present invention. It is accomplished in the following manner. When the noise signals 2B and 2C of cores 11 and 13 are connected, respectively, to the two inputs of the differential sense amplifier 41, they cancel each other. Thus, for a stored "zero," the net output is a "zero." If a "one" had been stored in the information core 11, the noise signal of the canceling core 13 cuts off the portion 33 of the signal of FIG. 2A to produce the result shown in FIG. 2D, i.e. the read-out of a stored binary one.

A suitable differential sense amplifier 41 for the noise canceling system of FIG. 1 is shown schematically in FIG. 3. The sense windings 17 and 19 from cores 11 and 13 are connected through balanced resistors 43 and 45 respectively to ground; and, the signals across these resistors are respectively connected to the bases 47 and 49 of the transistors 51 and 53. The collectors of these transistors are connected to balanced primaries 55 and 57 of a transformer 59. Thus, as long as equal noise signals are derived from the two sense windings, there is no current through the output winding 61 of the transformer. When, however, winding 17 carries the signal 35 as a result of a flux reversal due to read-out of a binary one signal and the winding 19 has no corresponding signal, the transistor 51 conducts more heavily than the transistor 53 and a suitable output signal appears across the terminals 63 and 65. Since this amplifier has a linear quality, its signal output 39 (FIG. 2D) corresponds to the stored "one" signal 35 of FIG. 2A.

FIG. 4 is a diagrammatic representation of the invention as employed in a memory system. For purposes of illustration, the memory is shown as having a capacity of four words of four digits each.

The system comprises a plurality of information cores 11 arranged in four horizontal rows and four vertical columns of four cores each. Each row represents a data processing word and the cores of each column, an information bit in the word with which they are associated. A noise canceling core 13 is provided for each word. Each word also has a separate read-write driver 65 and each column, i.e. digit plane, has a common digit driver 67.

Each read-write driver 65 is connected to a horizontal conductor 69 which links all of the cores 11 associated with its particular word and, also, a noise canceling core 13. These drivers apply to the conductor 69 a repetitive cycle of a full read pulse R followed by a half write pulse $W/2$ in the manner described with reference to the system of FIG. 1.

The digit drivers 67 are each connected to a vertical conductor 71 which links all the cores 11 in the particular digit plane with which it is associated. These conductors 71 are each pulsed by their respective drivers with half write $W/2$ signals, corresponding to the input to the conductor 21 in the system of FIG. 1. In accordance with established techniques, informatiion is written into the memory a word at a time by applying a half write pulse $W/2$ to a selected driver 65 and an additional half write pulse to the drivers 67 corresponding to the digit locations where it is desired to write a "one." The coincidence of half write pulses accomplishes a flux reversal and writes a "one" into the cores concerned. The remaining cores of the word, having experienced only a half write pulse, remain at "zero." Read-out is accomplished by applying a full read pulse R to the driver 65 linking all the cores of the memory address of the word concerned.

For every memory cycle, the signal in each noise canceling core 13 is the voltage induced in the output winding when the flux condition of the core is driven in its minor loop 25 (see FIG. 1), through points 27 and 23 by the sequence of a half write pulse $W/2$ followed by a full read pulse R. In the differential amplifiers 75 connected to information cores 11 which have stored a "zero," this output from their associated noise canceling core 13 will cancel the noise induced in winding 71, because both the information cores and the noise canceling cores have experienced exactly the same electrical history; i.e., a half write pulse followed by a full read. In the amplifiers, however, which are connected to cores which have experienced a flux-reversing additional half write pulse, via their respective digit windings 71, there will be no cancellation of the signal portion 35 (FIG. 2A) resulting from flux reversal, and a stored "one" will be indicated (FIG. 2D).

The Memory Input Register 79 and the Memory Output Register 81 determine the word location in the memory into which information is to be stored, and from which it is to be extracted. The manner in which this is accomplished is well known in the art and described, for example, in the U.S. patent application referenced above. Its operation does not affect the present invention and need not be discussed here. Similarly, gate 83 is employed in a conventional manner to render the sense amplifiers 75 insensitive to $di/dt$ signal disturbance during the write cycle.

Although the invention has been described with reference to a specific embodiment, other modifications and features are within its scope and the purview of the following claims.

What is claimed is:

1. In a magnetic memory system: a plurality of separate groups of magnetic memory devices all of which have a substantially uniform and rectangular hysteresis characteristic whereby they are capable of having their state of remanent magnetic flux disturbed in response to a current pulse of less than a critical magnitude and reversed in response to a pulse of greater than critical magnitude; a plurality of individual additional magnetic devices, each having a hysteresis characteristic substantially similar to that of said memory devices; means for simultaneously subjecting the memory devices of each group and one of said additional devices to a first common current pulse capable of disturbing but not reversing their respective flux conditions in one direction and then to a second common current pulse capable of reversing their respective flux conditions in the opposite direction; means for subjecting selected ones of said memory devices of said groups so pulsed to an additional current pulse capable in combination with said first common current pulse of reversing the flux condition of said selected devices in said one direction before said second common pulse reverses them in said opposite direction; first means for deriving from the individual devices of each group an independent signal corresponding to their respective flux responses to said current pulsing; second means independent of said first means for similarly deriving from said individual additional magnetic devices a signal responsive to said current pulsing; and, third means, sensitive to said first and second means for canceling signals from said first means substantially similar to signals from said second means and amplifying signals significantly different from signals from said second means.

2. In a magnetic memory system: a plurality of separate groups of magnetic cores all of which have a substantially uniform and rectangular hysteresis characteristic whereby they are capable of having their state of remanent magnetic flux disturbed in response to a current pulse of less than a critical magnitude and reversed in response to a pulse of greater than critical magnitude; a plurality of individual additional magnetic cores, each having a hysteresis characteristic substantially similar to that of said first mentioned cores; means for simultaneously subjecting the cores of each group and one of said additional cores to a first common current pulse capable of disturbing but not reversing their respective flux conditions in one direction and then to a second common current pulse capable of reversing their respective flux conditions in the opposite direction; means for subjecting selected ones of said cores of said groups so pulsed to an additional current pulse capable in combination with said first common current pulse of reversing the flux condition of said selected cores in said one direction before said second common pulse reverses them in said opposie direction; first means for deriving from the individual cores of each group an independent signal corresponding to their respective flux responses to said current pulsing; second means for similarly but independently deriving from said individual additional cores a signal responsive to said current pulsing; and, differential amplifier means, sensitive to said first and second means for canceling signals from said first means substantially similar to signals from said second means and amplifying signals significantly different from signals from said second means.

3. An electronic signal system comprising: a first plurality of magnetic elements each having first and second states of remanent magnetic flux; at least one other magnetic element having substantially identical magnetic flux characteristics; a first conductor linking at least some of said first plurality of elements and said at least one other element; means for applying to said first conductor first pulses of electric energy and second pulses of electric energy; a second conductor linking said first plurality of elements but not said at least one other element; means for applying third pulses of electric energy to said second conductor; one of said first and one of said third pulses being capable in combination, but not individually, of switching said elements from first to second state of remanent flux; one of said second pulses being capable individually of switching said elements from second to first state of flux; one of said first pulses alone being capable of disturbing but not reversing the flux condition of said elements; a third conductor linking said first plurality of elements; a fourth conductor linking said at least one other element; means for inducing in said third and fourth conductors a signal indication when their respective flux conditions are disturbed or reversed; a differential amplifier having first and second input connections; and means connecting said third conductor to said first input connection and said fourth conductor to said second input connection.

References Cited in the file of this patent

UNITED STATES PATENTS

| | | |
|---|---|---|
| 2,691,156 | Saltz | Oct. 5, 1954 |
| 2,734,185 | Warren | Feb. 7, 1956 |
| 2,876,442 | Disson | Mar. 3, 1959 |
| 2,889,540 | Bauer | June 2, 1959 |
| 2,953,774 | Slutz | Sept. 20, 1960 |
| 3,003,139 | Perkins | Oct. 3, 1961 |
| 3,007,056 | Logue et al. | Oct. 31, 1961 |